Feb. 23, 1943.    R. POLK, SR., ET AL    2,312,283
HOLDING FORK FOR CITRUS FRUIT
Original Filed June 7, 1939
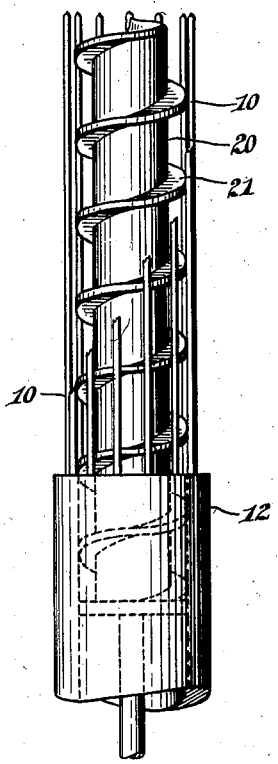
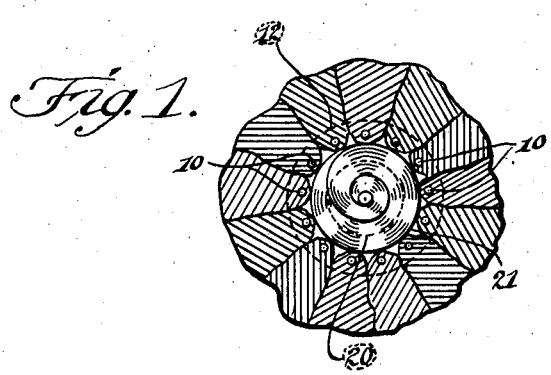
INVENTOR.
RALPH POLK SR. AND
RALPH POLK JR.
BY: Hood & Hahn
ATTORNEYS.

Patented Feb. 23, 1943

2,312,283

UNITED STATES PATENT OFFICE 2,312,283

HOLDING FORK FOR CITRUS FRUITS

Ralph Polk, Sr., Miami, and Ralph Polk, Jr., Tampa, Fla., assignors to The Polk Development Company, Tampa, Fla., a copartnership composed of Ralph Polk, Sr., and Ralph Polk, Jr.

Original application June 7, 1939, Serial No. 277,848. Divided and this application March 20, 1942, Serial No. 435,517

3 Claims. (Cl. 146—3)

This application is a division from our application Serial No. 277,848 filed June 7, 1939, for Holding fork for citrus fruits.

In preparing citrus fruits, such as grapefruit, for canning, it is necessary to separate the segment-shaped juice-cells from the inedible radiating integuments. To perform this operation mechanically, mechanisms such as are shown in Patents 2,121,098 and 2,129,101 have been put into commercial operation.

In order to support the peeled fruit for manipulation, it has heretofore been customary to provide a holding fork comprising a main stem or head and a circular series of small diameter tines, circumferentially spaced and so sized and proportioned that the tines could be caused to penetrate the peeled fruit parallel with the axis of the core of the fruit with the several tines lying within the apices of the fruit segments radially just outside the roots of the V's formed by the radiating integuments. The group of tines serves to hold the integuments as a bonded group during further manipulation.

In grapefruit, the apices of the V-shaped integuments are radially spaced from the polar axis of the fruit. In the seeded varieties the space within the apices of the integuments is filled with a pithy core which provides some radial bonding for the integuments, and holding forks, such as have been described above, serve adequately to hold the integuments during the operation of removal of the juice-cell groups.

In the seedless varieties the bond between adherent radial integuments is generally weaker than in the seeded varieties and, generally, there is no pithy core. Consequently, holding forks of the above-described character are not satisfactory unless they are so accurately proportioned and injected that the tines fit closely in the apices of a majority of the fruit segments.

Such accurate proportioning and injection is not commercially practicable and the object of our present invention is to provide an improved holding implement which will afford a better anchorage for the fruit, especially fruits of the seedless type.

The accompanying drawing illustrates our invention.

Fig. 1 is a plan of our improved tool, together with a fragmentary section of a citrus fruit into which the tool has been projected; and Fig. 2 a side elevation of the tool with some of the tines broken away for clarity of illustration.

Our tool comprises a circumferential series of parallel small tines 10 anchored in a body 12, the diameter of the series being such that the tines may be simultaneously projected into the fruit segments closely adjacent but within the apices thereof, as clearly indicated in Fig. 1. Tines 10 are long enough to project into the fruit a major portion of its diameter. Journalled, and axially movable within the main body 12, is a cylindrical clamping member 20 provided with a radially projecting rib, or ribs, 21 the tip of which is spaced from tines 10 a distance about equal to an integument thickness. Conveniently, this ribbed portion may be in the fork of a quick pitch screw thread as shown in Fig. 2.

When operating upon seedless fruit, the fruit is first peeled and tines 10 will be projected into the fruit within the apices of the majority of the fruit segments and then clamp 20 will be projected into the space between the vertices of the integuments 11, conveniently by combined axial and rotary movement, so as to clamp the apices of the integuments against the tines 10.

Thereupon the fruit may be manipulated to separate the juice cell groups from the integuments.

We claim as our invention:

1. A holding fork for whole peeled citrus fruits comprising, a circular series of parallel circumferentially spaced free-ended tines anchored in a suitable holder, so spaced and of such length that they may be projected polarwise a substantial distance into a plurality of fruit segments within and closely adjacent the vertices of such segments, and a clamping member axialy shiftable within said tine series, and having a diameter permitting projection polarwise into a citrus fruit to clamp the vertices of the segment integuments against the tines.

2. A holding fork for whole peeled citrus fruits comprising, a circular series of parallel circumferentially spaced free-ended tines anchored in a suitable holder, so spaced and of such length that they may be projected polarwise a substantial distance into a plurality of fruit segments within and closely adjacent the vertices of such segments, and a clamping member axially shiftable within said tine series and rotatable about the axis of said series, and having a diameter permitting projection polarwise into a citrus fruit to clamp the vertices of the segment integuments against the tines.

3. A holding fork for whole peeled citrus fruits comprising, a circular series of parallel circumferentially spaced free-ended tines anchored in a suitable holder, so spaced and of such length that they may be projected polarwise a substantial distance into a plurality of fruit segments within and closely adjacent the vertices of such segments, and a clamping member axially shiftable within said tine series rotatable about the axis of said series and provided with a helical rib having a diameter permitting projection polarwise into a citrus fruit to clamp the vertices of the segment integuments against the tines.

RALPH POLK, Sr.
RALPH POLK, Jr.